US012811645B2

(12) United States Patent
Ko et al.

(10) Patent No.: US 12,811,645 B2
(45) Date of Patent: Nov. 24, 2026

(54) BASE STATION AND METHOD FOR PERFORMING BEAM TRACKING IN HIGH-SPEED UNMANNED AERIAL VEHICLE COMMUNICATIONS

(71) Applicants: Korea University Research and Business Foundation, Seoul (KR); Pukyong National University Industry-University Cooperation Foundation, Busan (KR)

(72) Inventors: Young Chai Ko, Seoul (KR); Dong Hwee Kim, Yongin-si (KR); Byung Ju Lim, Busan (KR)

(73) Assignees: KOREA UNIVERSITY RESEARCH AND BUSINESS FOUNDATION, Seoul (KR); Pukyong National University Industry-University Cooperation Foundation, Busan (KR)

( * ) Notice: Subject to any disclaimer, the term of this patent is extended or adjusted under 35 U.S.C. 154(b) by 75 days.

(21) Appl. No.: 18/957,075

(22) Filed: Nov. 22, 2024

(65) Prior Publication Data

US 2025/0167845 A1 May 22, 2025

(30) Foreign Application Priority Data

Nov. 22, 2023 (KR) ........................ 10-2023-0163778
Feb. 16, 2024 (KR) ........................ 10-2024-0022324

(51) Int. Cl.
*H04B 7/06* (2006.01)

(52) U.S. Cl.
CPC .................................. *H04B 7/0617* (2013.01)

(58) Field of Classification Search
CPC .................................................... H04B 7/0617
USPC .......................................................... 375/295
See application file for complete search history.

(56) References Cited

U.S. PATENT DOCUMENTS

| | | | | |
|---|---|---|---|---|
| 2018/0115062 | A1* | 4/2018 | Cummings .......... | H04B 7/0617 |
| 2022/0030401 | A1* | 1/2022 | Oshima .................. | H04W 4/44 |
| 2024/0414684 | A1* | 12/2024 | Singh ................... | G01S 5/0247 |

FOREIGN PATENT DOCUMENTS

KR 10-2541640 B1 6/2023

OTHER PUBLICATIONS

Office Action issued on Mar. 6, 2026 for corresponding Korean Patent Application No. 10-2024-0022324, along with an English machine translation (14 pages).

(Continued)

*Primary Examiner* — Lihong Yu
(74) *Attorney, Agent, or Firm* — HAUPTMAN HAM, LLP

(57) ABSTRACT

A method of performing beam tracking in high-speed mobile UAV communications by a base station (BS) according to an embodiment of the present invention may comprise an initial beam training step including an operation of confirming an initially estimated channel for a k-th UAV among a plurality of UAVs connected through an antenna, and an operation of confirming an mk-th column index that maximizes an absolute value of a beam domain channel as an initial AoA; and a beam tracking step including an operation of tracking an actual AoA by applying a KF to the initial AoA, and various other embodiments may be possible.

13 Claims, 10 Drawing Sheets

(56) References Cited

OTHER PUBLICATIONS

Xu et al., "Location-Aided mMIMO Channel Tracking and Hybrid Beamforming for High-Speed Railway Communications: An Angle-Domain Approach", IEEE Systems Journal, vol. 14, No. 1, Mar. 2020, pp. 93-104.

Va et al., "Beam Tracking for Mobile Millimeter Wave Communication Systems", IEEE Xplore, GlobalSIP 2016, pp. 743-747.

* cited by examiner

BASE STATION AND METHOD FOR PERFORMING BEAM TRACKING IN HIGH-SPEED UNMANNED AERIAL VEHICLE COMMUNICATIONS

CROSS-REFERENCE TO RELATED APPLICATION

The present application claims the benefit of priority to Korean Patent Application Nos. 10-2023-0163778 filed on Nov. 22, 2023, and 10-2024-0022324 filed on Feb. 16, 2024, in the Korean Intellectual Property Office, the entire contents of which are incorporated herein for all purposes by this reference.

BACKGROUND OF THE INVENTION

Field of the Invention

The present invention relates to a base station (BS) and a method for performing beam tracking in two stages of an initial beam training stage and a beam tracking stage in high-speed mobile unmanned aerial vehicle (UAV) communications. This work was supported by Institute of Information & communications Technology Planning & Evaluation (IITP) grant funded by the Korea Government (MSIT) (No. 2022-0-00704, Development of 3DNET Core Technology for High-Mobility Vehicular Service).

Background of the Related Art

Generally, a link should be established in UAV communications to guarantee stable data transmission between a base station (BS) and a UAV. Meanwhile, when a problem occurs in beam alignment of the transmission and reception terminals of a BS as a plurality of UAVs move at a high speed, it may have an effect in maintaining a stable link.

On the other hand, when a UAV moves at a high speed, there is a problem of increasing overheads of beam training as frequent beam training operation is required since the influence on the Doppler shift, as well as change in the angle due to the movement, is large.

In addition, the Doppler frequency offset (DFO) generated by Doppler shift acts like a phase rotation matrix, and the phase rotation matrix may induce angle shift. According thereto, an existing initial beam training method has a problem in that it is difficult to distinguish an estimated angle from an actual angle in confirming the initial angle since the angle estimated by the reception terminal includes both the actual angle and the DFO.

SUMMARY OF THE INVENTION

The technical problem to be solved by the present invention relates to a BS and a method for calculating a Doppler shift value and performing beam tracking considering geometric relations and angle changes in a high-speed mobile UAV communication system.

In addition, the present invention proposes a BS and a method for performing beam tracking using initial AoA in order to reduce overheads of beam training according to high-speed movement of a UAV.

The technical problems of the present invention are not limited to the technical problems mentioned above, and unmentioned other technical problems will be clearly understood by those skilled in the art from the following description.

To accomplish the above objects, according to one aspect of the present invention, there is provided a method of performing beam tracking in high-speed mobile UAV communications by a base station (BS), the method comprising: an initial beam training step including an operation of confirming an initially estimated channel for a k-th UAV among a plurality of UAVs connected through an antenna, and an operation of confirming an mk-th column index that maximizes an absolute value of a beam domain channel as an initial AoA; and a beam tracking step including an operation of tracking an actual AoA by applying a KF to the initial AoA.

A base station (BS) performing beam tracking in high-speed mobile UAV communications according to an embodiment of the present invention may comprise: an antenna for communicating with a plurality of UAVs; and a processor for confirming an initially estimated channel for a k-th UAV among the plurality of UAVs, confirming an mk-th column index that maximizes an absolute value of a beam domain channel as an initial AoA, and tracking an actual AoA by applying a KF to the initial AoA.

DETAILED DESCRIPTION OF THE PREFERRED EMBODIMENT

Figure 1:
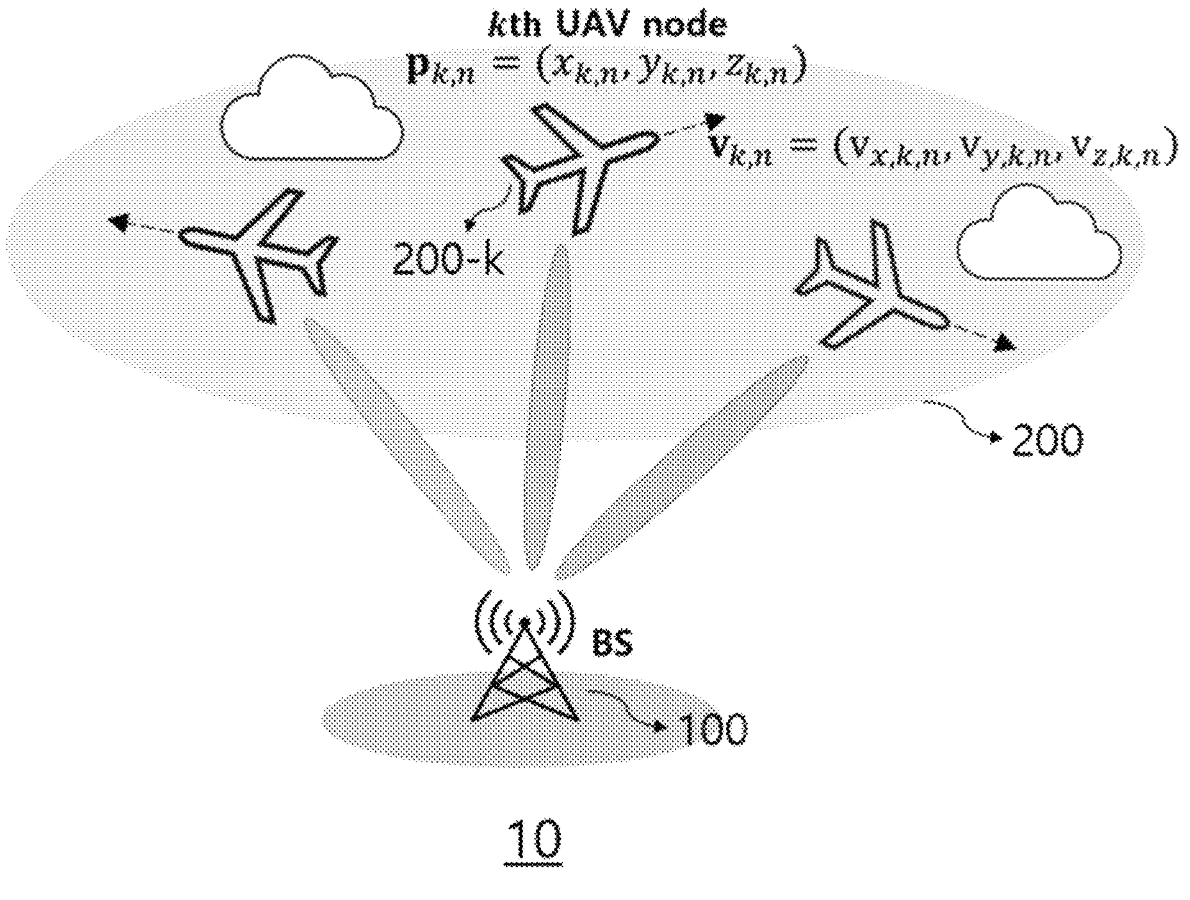
FIG. 1 is a view showing the configuration of a communication system according to an embodiment of the present invention.

Hereinafter, preferred embodiments of the present invention will be described in detail with reference to the accompanying drawings. The advantages and features of the present invention and the method for achieving them will become clear by referring to the embodiments described below in detail together with the accompanying drawings. However, the present invention is not limited to the embodiments disclosed below and will be implemented in various different forms. These embodiments are provided only to make the disclosure of the present invention complete and to fully inform those skilled in the art of the scope of the present invention, and the present invention is only defined by the scope of the claims. Like reference numerals refer to like elements throughout the specification.

Unless defined otherwise, all the terms (including technical and scientific terms) used in this specification may be used as meanings that can be commonly understood by those skilled in the art. In addition, terms defined in commonly used dictionaries are not interpreted ideally or excessively unless clearly and specifically defined. The terms used in this specification are to describe the embodiments and are not to limit the present invention. In this specification, singular forms also include plural forms unless specifically stated otherwise in the phrases.

The terms "comprises" and/or "comprising" used in this specification means that the mentioned components, steps, operations, and/or elements do not exclude the presence or addition of one or more other components, steps, operations and/or elements.

FIG. 1 is a view showing the configuration of a communication system according to an embodiment of the present invention.

Referring to FIG. 1, a communication system 10 includes a base station (BS) 100 and a plurality of unmanned aerial vehicles (UAVs) 200-*k*, and the components may be connected through a high-speed mobile UAV communication network that uses various communication methods such as a 5G network, multiple antennas and beam forming, a mesh network, or satellite communication.

According to an embodiment of the present invention, the BS 100 may perform communication with k UAVs 200-*k* moving at a fixed speed along a predetermined path in an uplink communication system 10 using a mmWave band.

Figure 2:
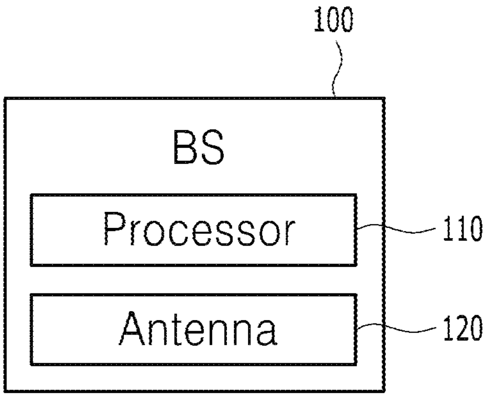
FIG. 2 is a block diagram showing the configuration of a BS according to an embodiment of the present invention.

FIG. 2 is a block diagram showing the configuration of a BS according to an embodiment of the present invention.

Referring to FIG. 2, the BS 100 may include a processor 110 and an antenna 120. The antenna 120 may be a uniform planar array (UPA) antenna configured of $N=N_x \times N_y$ antennas.

According to an embodiment of the present invention, the processor 110 may communicate with k UAVs 200 having a single antenna through the antenna 120. At this point, the processor 110 may confirm the speed of the UAV 200 as the UAV 200 moves at a fixed speed along a predetermined path, but it may be difficult to confirm the detailed route.

According to an embodiment of the present invention, when it is difficult to confirm the detailed route of the k-th UAV 200-*k*, the processor 110 may confirm the channel in the n-th frame transmitted from the k-th UAV 200-*k* to the BS 100.

Equation 1 is an equation for calculating the channel in the n-th frame transmitted from the k-th UAV to the BS according to an embodiment of the present invention.

$$h_{k,n} = a_{k,n} \exp\left(j(\phi_{p,k,n} + \phi_{f_{D,k,n}})\right) O(f_{D,k,n}) a_{BS}(x_{k,n}) \quad \text{[Equation 1]}$$

$$\phi_{p,k,n} = 2\pi f_{D,k,n} n T_s$$

Here, $a_{k,n}$ is the channel gain, $\phi_{p,k,n}$ is the phase offset, $a_{BS}X_{k,n}$ is the array response vector of the UPA antenna 120, $\phi_{f_{D,k,n}}$ is the absolute phase offset, $f_{D,k,n}$ is the Doppler shift value, and $T_s$ is the coherence time.

Equation 2 is an equation for calculating an array response vector of an antenna according to an embodiment of the present invention.

$$a_{BS}(x_{k,n}) = a_x(u_{k,n}) \otimes a_y(v_{k,n}) \quad \text{[Equation 2]}$$

$$a_x(u_{k,n}) = \left[1 \ldots e^{j(N_x-1)u_{k,n}}\right]^T$$

$$a_y(v_{k,n}) = \left[1 \ldots e^{j(N_y-1)v_{k,n}}\right]^T$$

$$x_{k,n} = [u_{k,n},\ v_{k,n}]^T$$

Here, $u_{k,n}$ and $v_{k,n}$ are spatial angles in the horizontal and vertical directions, which can be calculated as $$\frac{2\pi d}{\lambda}\cos(\phi_{k,n})\sin(\theta_{k,n}) \text{ and } \frac{2\pi d}{\lambda}\sin(\phi_{k,n})\sin(\theta_{k,n}).$$

In addition, $\phi_{k,n}$ is the azimuth angle, $\theta_{k,n}$ is the elevation angle, d is the antenna spacing, $\lambda$ is the antenna wavelength, and $x_{k,n}$ is a vector for the spatial angle.

Equation 3 is an equation for calculating a relative DFO matrix according to an embodiment of the present invention.

$$\text{diag}\left(O_x(f_{D,k,n}) \otimes O_y(f_{D,k,n})\right) \quad \text{[Equation 3]}$$

$$O_x(f_{D,k,n}) = \left[1 \ldots e^{j\frac{\lambda}{c} f_{D,k,n}(N_x-1)u_{k,n}}\right]^T$$

$$O_y(f_{D,k,n}) = \left[1 \ldots e^{j\frac{\lambda}{c} f_{D,k,n}(N_y-1)v_{k,n}}\right]^T$$

Here, $O(f_{D,k,n})$ is a relative DFO matrix, $O_x(f_{D,k,n})$ and $O_y(f_{D,k,n})$ are relative DFO vectors for the x-axis and y-axis.

According to an embodiment of the present invention, the processor 110 may estimate the offsets and Doppler shift values using a preset technique in the initial beam training stage.

Figure 3:
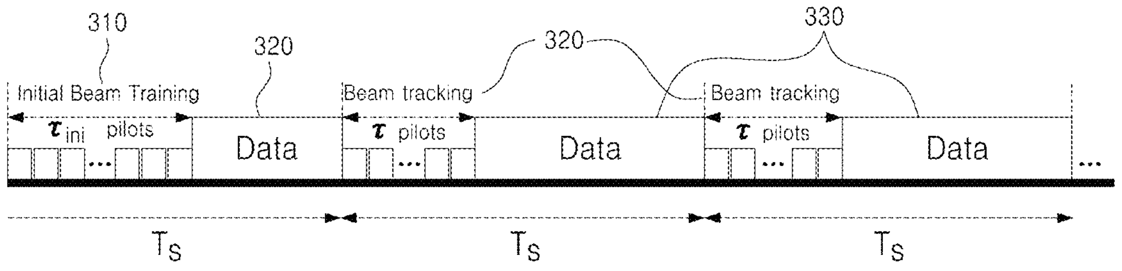
FIG. 3 is a view showing the frame structure in a communication system according to an embodiment of the present invention.

FIG. 3 is a view showing the frame structure in a communication system according to an embodiment of the present invention.

Referring to FIG. 3, a frame 300 may be configured of an initial beam training phase 310, a beam tracking phase 320 repeating at a TS cycle, and a data transmission phase 330.

According to an embodiment of the present invention, the BS 100 may transmit pilot signals ($T_{ini}$ pilots) for beam training in the initial beam training phase 310, and may transmit pilot signals (T pilots) for beam tracking in the beam tracking phase 320. For example, the BS 100 may use a DFT codebook-based method that includes a phase rotation matrix in the initial beam training phase 310, and use a Kalman filter (KF)-based method that utilizes a monopulse signal in the beam tracking phase 320. In addition, the BS 100 may perform data transmission by estimating a Doppler shift value.

According to an embodiment of the present invention, in the initial beam training phase 310, the BS 100 may acquire an initial angle of arrival (AoA). At this point, the acquired initial AoA includes an actual AoA and a Doppler frequency offset (DFO), and the BS 100 may acquire only the actual AoA by separating the DFO from the acquired initial AoA. Thereafter, the BS 100 may continuously track the actual AoA in the beam tracking phase 320.

According to an embodiment of the present invention, in the initial beam training phase 310, the BS 100 may acquire initial AoA information using a discrete Fourier transform (DFT) codebook when the structure of the antenna 120 is a uniform planar array (UPA).

Equation 4 is an equation for calculating the initial AoA according to an embodiment of the present invention.

$$F_{BS} = \frac{1}{\sqrt{N_x N_y}}(F_x \otimes F_y) \qquad \text{[Equation 4]}$$

Here, $N_x$ is the number of antennas on the x axis, $N_y$ is the number of antennas on the y axis, $$[F_x]_{p,q} = e^{-j2\pi\frac{pq}{N_x}}, \text{ and } [F_y]_{p,q} = e^{-j2\pi\frac{pq}{N_y}}.$$

Thereafter, the BS 100 may produce a beam domain channel using a DFT codebook.

Equation 5 is an equation for calculating a beam domain channel according to an embodiment of the present invention.

$$\tilde{h}_{k,ini} = F_{BS}\hat{h}_{k,ini} \qquad \text{[Equation 5]}$$

Here, $\hat{h}_{k,ini}$ is the initially estimated channel.

According to an embodiment of the present invention, the BS 100 may determine the $m_k$-th column index of $F_{BS}$, which maximizes the absolute value of the beam domain channel $\tilde{h}_{k,ini}$, as the initial AoA.

Equation 6 is an equation for calculating the column index of the initial AoA that maximizes the absolute value of the beam domain channel according to an embodiment of the present invention.

[Equation 6]

$$[\tilde{h}_{k,ini}]_{m_k} = a_{k,ini}\exp\left(j\left(\phi_{p,k,ini} + \phi_{f_{D,k,ini}}\right)\right)f^T_{BS,m_k}O(f_{D,k,ini})a_{BS}(x_{k,ini})$$

$$m_k = (i_k - 1)N_y + j_k$$

$$i_k = 0, 1, \ldots, N_x$$

$$j_k = 0, 1, \ldots, N_y$$

Here, $$f^T_{BS,m_k}$$

is the $m_k$-th row of $F_{BS}$, and $i_k$ and $j_k$ are the initial AoAs on the x axis and y axis.

According to an embodiment of the present invention, the initial AoA may include an actual AoA and a relative DFO generated by Doppler shift. At this point, the BS 100 may use a phase rotation matrix $O_R$ that removes the relative DFO within the range of the initial AoA to confirm an accurate actual AoA.

Equation 7 is an equation for calculating a phase rotation matrix according to an embodiment of the present invention.

$$O_R(\psi_{x,k}, \psi_{y,k}) = \text{diag}(R_{x,k} \otimes R_{y,k}) \qquad \text{[Equation 7]}$$

$$R_{x,k} = \left[1 \ \ldots \ e^{j(N_x-1)}\psi_{x,k}\right]^T$$

$$R_{y,k} = \left[1 \ \ldots \ e^{j(N_y-1)}\psi_{y,k}\right]^T$$

-continued $$\psi_{x,k} \in \left\{x \mid x = -\frac{\pi}{N_x} + \frac{2n\pi}{N_x^2},\ n \in \{0, 1, \ldots, N_x\}\right\}$$

$$\psi_{y,k} \in \left\{y \mid y = -\frac{\pi}{N_y} + \frac{2n\pi}{N_y^2},\ n \in \{0, 1, \ldots, N_y\}\right\}$$

Here, $O_R$ is the phase rotation matrix, $R_{x,k}$ and $R_{y,k}$ are phase rotation vectors with respect to the x axis and the y axis, and $\psi_{x,k}$ and $\psi_{y,k}$ are rotation angles with respect to the x axis and the y axis.

According to an embodiment of the present invention, the BS 100 may express a rotated beam domain channel using a phase rotation matrix $O_R$.

Equation 8 is an equation for calculating a rotation beam domain channel according to an embodiment of the present invention.

[Equation 8]

$$[\tilde{h}^r_{k,ini}]_{m_k} =$$

$$\alpha_{k,n}e^{j\left(\phi_{k,n}+\phi_{f_{D,k,n}}\right)}f^T_{BS,m_k}O_R(\psi_{x,k}, \psi_{y,k})\,O\,(f_{D,k,ini})a_{BS}(x_{k,ini}) =$$

$$\frac{\alpha_{k,n}e^{j\left(\phi_{k,n}+\phi_{f_{D,k,n}}\right)}}{\sqrt{N_x N_y}}\sum_{n_x=0}^{N_x-1} e^{-jn_x\left(2\pi\frac{i_k-1}{N_x}-\left(t_{D,k}u_{k.ini}+\psi_{x,k}\right)\right)} \times$$

$$\sum_{n_y=0}^{N_y-1} e^{-jn_y\left(2\pi\frac{j_k-1}{N_y}-\left(t_{D,k}v_{k.ini}+\psi_{y,k}\right)\right)} =$$

$$\frac{\alpha_{k,n}e^{j\left(\phi_{k,n}+\phi_{f_{D,k,n}}\right)}}{\sqrt{N_x N_y}} e^{-j\frac{N_x-1}{2}\left(2\pi\frac{i_k-1}{N_x}-\left(t_{D,k}u_{k.ini}+\psi_{x,k}\right)\right)} \times$$

-continued $$\frac{\sin\left(\left(2\pi\frac{i_k-1}{N_x} - (t_{D,k}u_{k.ini} + \psi_{x,k})\right)\cdot\frac{N_x}{2}\right)}{\sin\left(\left(2\pi\frac{i_k-1}{N_x} - (t_{D,k}u_{k.ini} + \psi_{x,k})\right)\frac{1}{2}\right)} \times$$

$$e^{-j\frac{N_y-1}{2}\left(2\pi\frac{i_k-1}{N_y}-\left(t_{D,k}v_{k.ini}+\psi_{y,k}\right)\right)} \times$$

$$\frac{\sin\left(\left(2\pi\frac{j_k-1}{N_y} - (t_{D,k}v_{k.ini} + \psi_{y,k})\right)\cdot\frac{N_y}{2}\right)}{\sin\left(\left(2\pi\frac{j_k-1}{N_y} - (t_{D,k}v_{k.ini} + \psi_{y,k})\right)\frac{1}{2}\right)}$$

$$t_{D,k} = 1 + \frac{\lambda}{c}f_{D,k,ini}$$

Here, $u_{k.ini}$ and $v_{k.ini}$ are actual AoAs, and $f_{D.k,ini}$ is the initial Doppler value.

According to an embodiment of the present invention, the BS 100 may confirm $$\psi^*_{x,k} \text{ and } \psi^*_{y,k}$$

that maximize the value of $$[\tilde{h}^r_{k,ini}]_{m_k}$$

by performing an exhaustive search.

According to an embodiment of the present invention, the BS 100 may calculate $i_k$ and $j_k$ using Equation 6. Accordingly, the BS 100 may separately confirm the actual AoA and the relative DFO $t_{D,k}$ using the phase rotation matrix.

Figure 4:
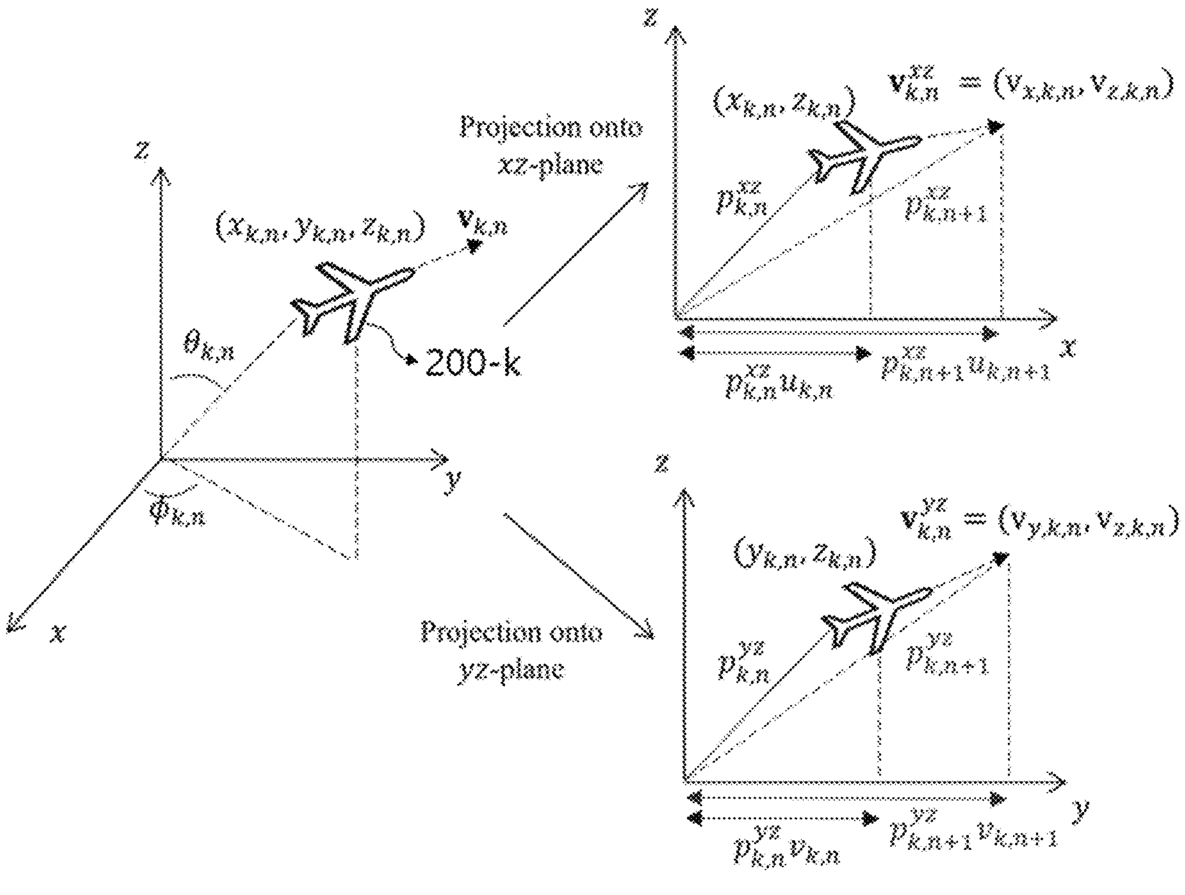
FIG. 4 is a view showing the relation between UVA movement and AoA information in a communication system according to an embodiment of the present invention.

FIG. 4 is a view showing the relation between UVA movement and AoA information in a communication system according to an embodiment of the present invention.

Referring to FIG. 4, the BS 100 may perform beam tracking by applying a KF to the calculated initial AoA. At this point, the BS 100 may model changes in the spatial angles u and v by orthogonally projecting the position of the k-th UAV 200-*k* onto the xz plane and the yz plane.

Equation 9 is an equation for calculating a change in the spatial angle with respect to the position of a UAV according to an embodiment of the present invention.

$$u_{k,n+1} = \frac{P^{xz}_{k,n}}{P^{xz}_{k,n+1}} u_{k,n} + \frac{V_{x,k,n}}{P^{xz}_{k,n+1}} T_S \qquad \text{[Equation 9]}$$

$$v_{k,n+1} = \frac{P^{yz}_{k,n}}{P^{yz}_{k,n+1}} v_{k,n} + \frac{v_{y,k,n}}{P^{yz}_{k,n+1}} T_S$$

Here, $$P^{xz}_{k,n} \text{ and } P^{yz}_{k,n}$$

are the distance from the BS 100 when movement of the UAV 200-*k* is orthogonally projected onto the xz plane and the yz plane, $V_{x,k,n}$ and $V_{y,k,n}$ are velocities in the x-axis and y-axis directions, and $$P^{xz}_{k,n+1}$$

is a value estimating the distance when movement of the UAV 200-*k* is orthogonally projected onto the xy plane in the n+1-th frame. The BS 100 may confirm the distance to the UAV 200-*k* using a predetermined technique.

Equation 10 is an equation for calculating an estimated distance to the UVA in the n+1-th frame according to an embodiment of the present invention.

$$P^{xz}_{k,n+1} = \sqrt{(x_{k,n} + v_{x,k,n}T_s)^2 + (z_{k,n} + v_{z,k,n}T_s)^2} \qquad \text{[Equation 10]}$$

According to an embodiment of the present invention, the BS 100 may generate a state model in the n-th frame based on Equation 10.

Equation 11 is an equation for calculating a state model in the n-th frame according to an embodiment of the present invention.

$$x_{k,n+1} = \begin{bmatrix} u_{k,n+1} \\ v_{k,n+1} \end{bmatrix} = \begin{bmatrix} \frac{P^{xz}_{k,n}}{P^{xz}_{k,n+1}} & 0 \\ 0 & \frac{P^{yz}_{k,n}}{P^{yz}_{k,n+1}} \end{bmatrix} \begin{bmatrix} u_{k,n} \\ v_{k,n} \end{bmatrix} + \qquad \text{[Equation 11]}$$

$$\begin{bmatrix} \frac{V_{x,k,n}}{P^{xz}_{k,n+1}} T_s \\ \frac{V_{y,k,n}}{P^{yz}_{k,n+1}} T_s \end{bmatrix} + \begin{bmatrix} \omega_{u,k,n} \\ \omega_{v,k,n} \end{bmatrix} = Fx_{k,n} + b_{k,n} + n^p_{k,n}$$

Here, $x_{k,n+1}$ is the state model at the n-th frame, and $\omega_{u,k,n}$ and $\omega_{v,k,n}$ are process noises having variances $$\sigma^2_u \text{ and } \sigma^2_v.$$

Thereafter, the BS 100 may derive a measurement model using a monopulse signal.

Equation 12 is an equation for calculating a measurement model according to an embodiment of the present invention.

$$r_{k,n} = \begin{bmatrix} \tan\left(\frac{u_{k,n}}{2}\right) \\ \tan\left(\frac{v_{k,n}}{2}\right) \end{bmatrix} + \begin{bmatrix} n_{u,k,n} \\ n_{v,k,n} \end{bmatrix} = g(x_{k,n}) + n^m_{k,n} \qquad \text{[Equation 12]}$$

Here, $n_{u,k,n}$ and $n_{v,k,n}$ are values of measurement noises of the monopulse signal having a variance of $$\sigma^2_m.$$

Thereafter, the BS 100 may estimate an AoA by applying a KF based on Equations 11 and 12.

Equation 13 is an equation for calculating an estimated AoA according to an embodiment of the present invention.

$$\hat{x}^-_{k,n} = F\hat{x}^-_{k,n-1} + b_{k,n} \qquad \text{[Equation 13]}$$

$$P^-_{k,n} = FP_{k,n-1}F^T + Q^p_{k,n}$$

Here, $$\hat{x}^-_{k,n}$$

is a predicted state, $$P^-_{k,n}$$

is a predicted error covariance matrix, and $P_{k,n-1}$ is an estimated value of the AoA for a previous (n−1-th) frame.

Thereafter, the BS 100 may acquire an innovation value from the measurement model calculated through Equation 12.

Equation 14 is an equation for calculating an innovation value according to an embodiment of the present invention.

$$\tilde{r}_{k,n} = r_{k,n} - g(\hat{x}_{k,n}^-) = g(x_{k,n}) + n_{k,n}^m - g(\hat{x}_{k,n}^-) \simeq Gx_{k,n} + n_{k,n}^m - G\hat{x}_{k,n}^-$$
$$S_{k,n} = GP_{k,n}^- G^T + Q_{k,n}^m,$$
$$K_{k,n} = P_{k,n}^- G^T S_{k,n}^{-1}, \quad \text{[Equation 14]}$$

Here, G is the Jacobian matrix, $S_{k,n}$ is the innovation covariance, and $K_{k,n}$ is the Kalman gain.

According to an embodiment of the present invention, as G is approximated to x with respect to tan x(x<1) in Equation 14, it may be set to G≅0.5 I. Thereafter, the BS 100 may confirm the predicted state of Equation 13 as an updated state according to the value calculated using Equation 14, and acquire an error covariance.

Equation 15 is an equation for calculating an updated state and an error covariance according to an embodiment of the present invention.

$$\hat{x}_{k,n}^- = \hat{x}_{k,n}^- + K_{k,n}\tilde{r}_{k,n}$$
$$P_{k,n} = P_{k,n}^- - K_{k,n}S_{k,n}K_{k,n}^T \quad \text{[Equation 15]}$$

According to an embodiment of the present invention, the BS 100 may track the AoA by confirming the updated state and error covariance of the predicted state for each frame using Equation 15 for each frame.

According to an embodiment of the present invention, the BS 100 may set an assumption that the measurement model using a monopulse signal is $$\tan\left(\frac{x}{2}\right) \simeq \frac{x}{2}.$$

At this point, as the value of AoA increases, the linearization loss for this assumption may increase. Therefore, the BS 100 may adjust so that the linearization loss does not increase through mechanical alignment. In addition, the BS 100 may adjust so that the AoA appears as a value within a specific range by adjusting the mechanical alignment so that the array response vector of the BS 100 faces the UAV 200-*k*.

Equation 16 is an equation for calculating a linearization loss according to an embodiment of the present invention.

$$f(x) = \left|\tan\frac{x}{2} - \frac{x}{2}\right| \quad \text{[Equation 16]}$$

According to an embodiment of the present invention, the BS 100 may adjust the direction of the array response vector to set each spatial angle to 0 when the value of f(x) is greater than the threshold value $\zeta_{th}$. In addition, for the plurality of UAVs 200, the BS 100 may adjust the direction of the array response vector to the center value of the spatial angles with respect to the plurality of UAVs 200. Accordingly, the BS 100 may operate in an initial state when performing the mechanical alignment, and may establish an initial directional link between the BS 100 and the k-th UAV 200-*k* in the initial beam training phase 310.

According to an embodiment of the present invention, when the BS 100 estimates an AoA by performing beam tracking for each frame in the beam tracking phase 320, it may compensate for the DFO to transmit data in the data transmission phase 330. At this point, the BS 100 may calculate a Doppler shift value to perform data transmission for multiple UAVs 200 moving three-dimensionally. The BS 100 may estimate the Doppler shift value on the basis of previously calculated AoA information.

Equation 17 is an equation for estimating a Doppler shift value according to an embodiment of the present invention.

$$f_{D,k,n} = \frac{\langle V_{k,n}, P_{k,n}\rangle}{\lambda\|P_{k,n}\|} \quad \text{[Equation 17]}$$
$$V_{k,n} = (V_{x,k,n}, V_{y,k,n}, V_{z,k,n})$$
$$P_{k,n} = (x_{k,n}, y_{k,n}, z_{k,n})_S$$

Here, symbol <*> means the inner product, $V_{k,n}$ is the velocity vector of the UAV 200-*k*, and $V_{k,n}$ is the position vector of the UAV 200-*k*.

According to an embodiment of the present invention, since the UAV 200-*k* moves according to a predetermined speed and path, the BS 100 may confirm the distance size value among the components of the velocity vector of the UAV 200-*k* on the basis of predetermined speed and path. Accordingly, the BS 100 may estimate the position vector for a specific UAV 200-*k* by using the previously estimated AoA and the confirmed distance size value.

Equation 18 is an equation for estimating a position vector according to an embodiment of the present invention.

$$\hat{P}_{k,n} = (\hat{x}_{k,n}, \hat{y}_{k,n}, \hat{z}_{k,n}) = \|P_{k,n}\|\left(\frac{\hat{u}_{k,n}}{\pi}, \frac{\hat{v}_{k,n}}{\pi}, \sqrt{1 - \left(\left(\frac{\hat{u}_{k,n}}{\pi}\right)^2 + \left(\frac{\hat{v}_{k,n}}{\pi}\right)^2\right)}\right) \quad \text{[Equation 18]}$$

According to an embodiment of the present invention, the BS 100 may acquire a Doppler shift value by substituting the estimated position vector calculated using Equation 15 into Equation 14, and the acquired Doppler shift value may be used for DFO compensation.

Figure 5:
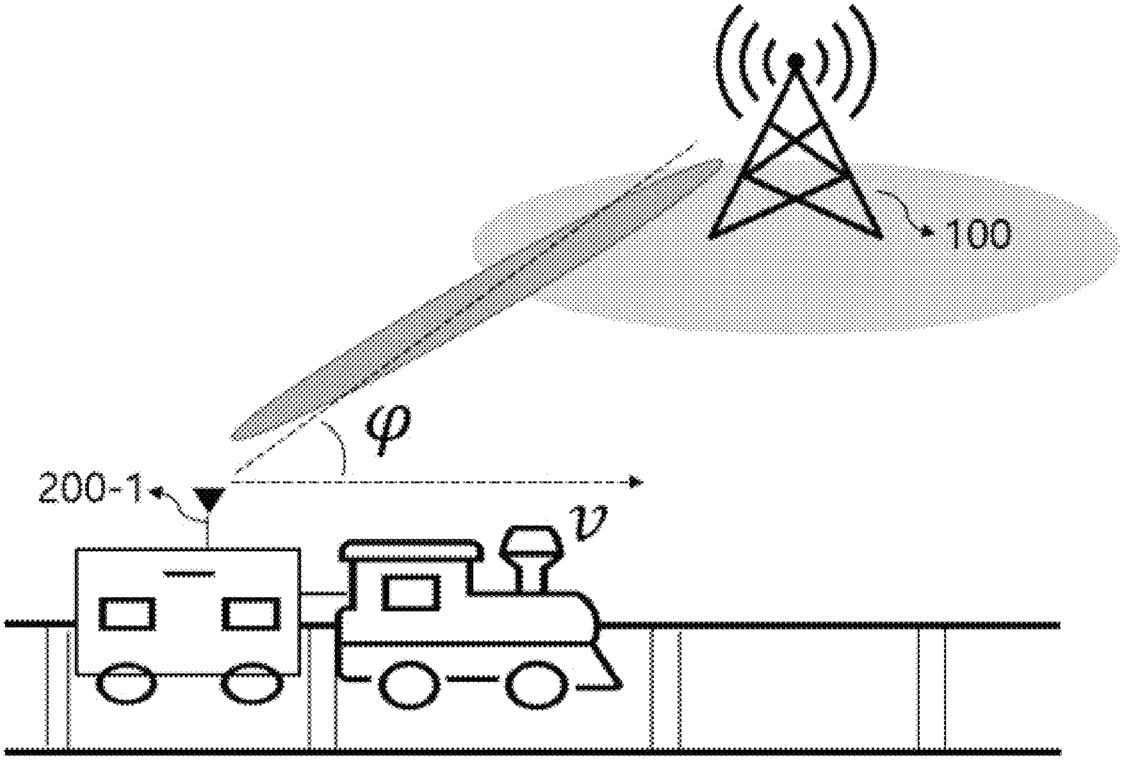
FIG. 5 is a view showing transmission of data to a uniform linear array (ULA) by a BS in a data transmission phase according to an embodiment of the present invention.

FIG. 5 is a view showing transmission of data to a ULA by a BS in a data transmission phase according to an embodiment of the present invention.

Referring to FIG. 5, the BS 100 may perform data transmission for the first UAV 200-1 having an antenna array (uniform linear array: ULA) of a plurality of antennas arranged in a straight line among the UAVs 200-*k* in the data transmission phase 330. For example, the ULA may be installed in a moving vehicle such as a train and controlled to perform communication with the BS 100 while the moving vehicle moves.

According to an embodiment of the present invention, the BS 100 may estimate an AoA of the first UAV 200-1 in the beam tracking phase 320 and calculate the Doppler shift value using the estimated AoA. At this point, since the position of the moving first UAV 200-1 changes in real time, the Doppler shift value may also change in real time. Accordingly, the BS 100 may calculate the Doppler shift value for each frame for data transmission to the first UAV 200-1.

Equation 19 is an equation for calculating a Doppler shift value according to an embodiment of the present invention.

$$f_D = f_c\frac{v}{c}\cos\varphi \quad \text{[Equation 19]}$$

Figure 6:
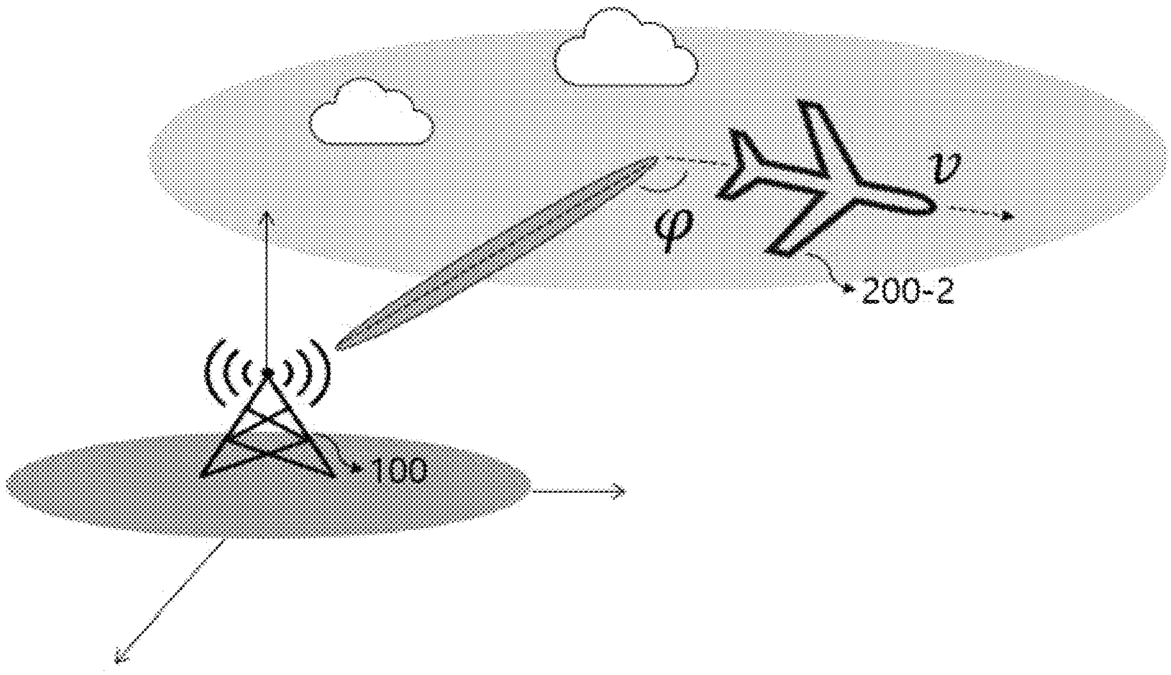
FIG. 6 is a view showing transmission of data to a uniform planar array (UPA) in a data transmission phase by a BS according to an embodiment of the present invention.

FIG. 6 is a view showing transmission of data to a UPA in a data transmission phase by a BS according to an embodiment of the present invention.

Referring to FIG. 6, the BS 100 may perform data transmission to the second UAV 200-2 by calculating the Doppler shift value for the UPA antenna 120 in the data transmission phase 330.

According to an embodiment of the present invention, the BS 100 may calculate an estimated AoA for the second UAV 200-2 and confirm the distance vector based on a predetermined path of the second UAV 200-2. Thereafter, the BS 100 may calculate the position vector of the second UAV 200-2 using the estimated AoA and the distance vector, and calculate the Doppler shift value $f_{D,k,n}$ by applying the calculated velocity vector and distance vector to Equation 14.

Figure 7:
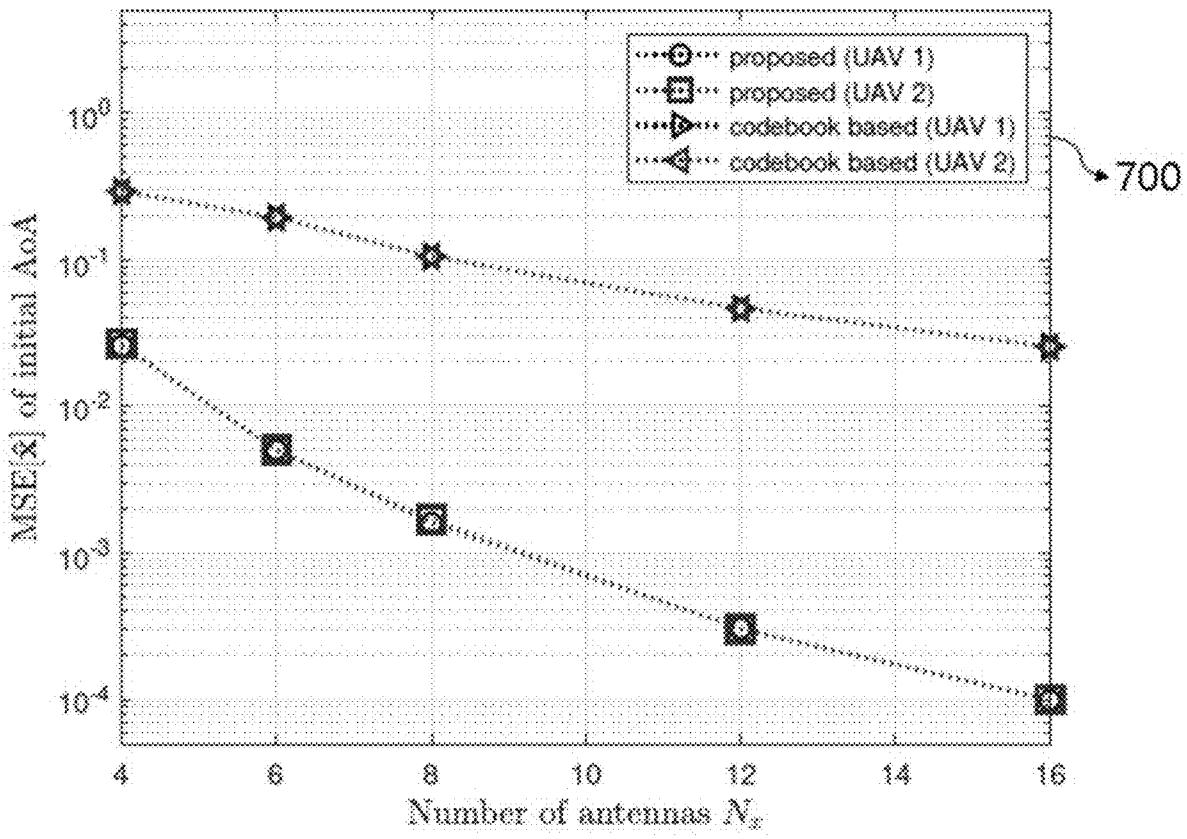
FIG. 7 is a graph showing mean squared error (MSE) performance of initial beam training according to an embodiment of the present invention.
Figure 8:
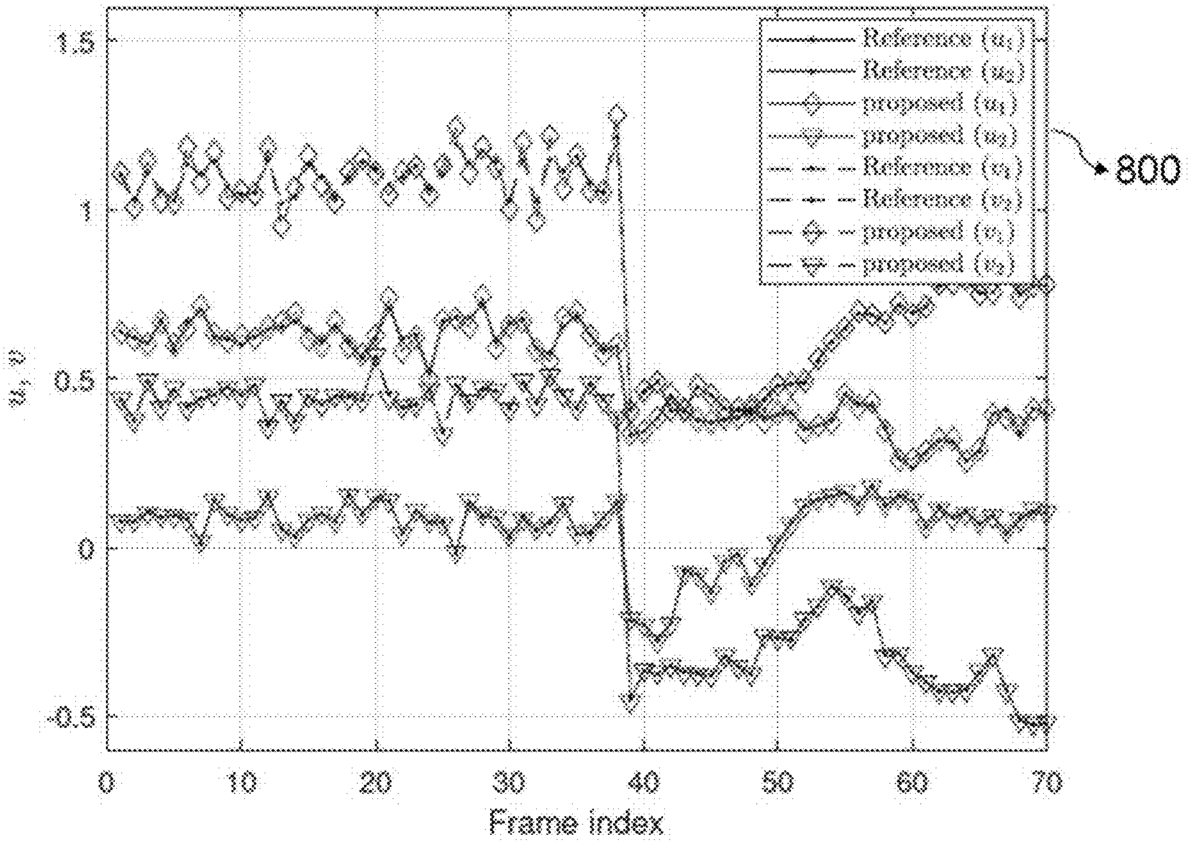
FIG. 8 is a graph showing performance of real-time beam tracking according to an embodiment of the present invention.
Figure 9:
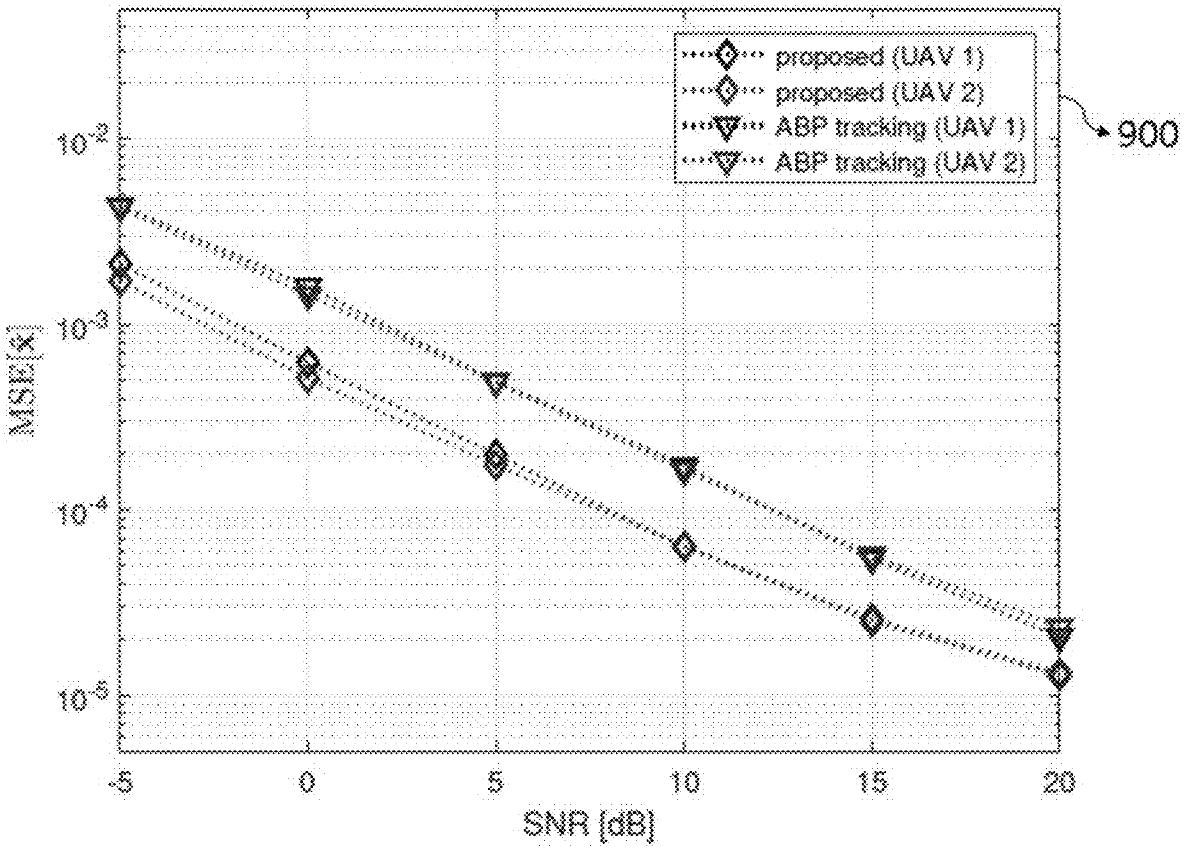
FIG. 9 is a graph showing MSE performance of beam tracking according to an embodiment of the present invention.

FIGS. 7 to 9 are graphs showing results of an experiment performing initial beam training and beam tracking according to an embodiment of the present invention.

According to an embodiment of the present invention, the BS 100 may set the number of UPAs $N_x$=$N_y$, K, constant speed $\|V_{k,n}\|$, standard deviations σx and σy with respect to horizontal and vertical directions, carrier frequency, and fixed signal to noise ratio (SNR) to 8, 2, 240 km/h, 0.05, 28 GHz, and 15 dB, respectively.

FIG. 7 is a graph showing MSE performance of initial beam training according to an embodiment of the present invention.

According to an embodiment of the present invention, the BS 100 may calculate an AoA by performing beam training using a phase rotation matrix in the initial beam training phase 310.

Referring to FIG. 7, the MSE performance graph 700 shows values of MSE ('proposed') of the calculated AoA and MSE ('codebook') of AoA according to conventional codebook-based beam training.

According to an embodiment of the present invention, as the BS 100 calculates an AoA by performing beam training based on a phase rotation matrix, a mean squared error (MSE) performance higher than that of the conventional codebook-based beam training can be demonstrated.

FIG. 8 is a graph showing performance of real-time beam tracking according to an embodiment of the present invention.

According to an embodiment of the present invention, the BS 100 may perform KF beam tracking applied with a KF using a monopulse signal and mechanical alignment. At this point, the threshold value $\zeta_{th}$ of the mechanical alignment may be set to 0.1.

Referring to FIG. 8, the beam tracking performance graph 800 shows u and v values (references) for the initial direction of the antenna array and changed u and v values (proposed) according to performing KF beam tracking. Here, it can be confirmed that the difference between the initial values (reference) and the changed values (proposed) is smaller than 0.1.

According to an embodiment of the present invention, as the BS 100 performs KF beam tracking using a monopulse signal and mechanical alignment, it may stably perform beam tracking without changing the antenna array from the initial direction.

FIG. 9 is a graph showing MSE performance of beam tracking according to an embodiment of the present invention.

According to an embodiment of the present invention, the BS 100 may perform KF beam tracking using a monopulse signal in the beam tracking phase 320. Generally, ABP beam tracking using an adaptive beamforming and phased-array antenna (ABP) method may be performed in the beam tracking phase.

Referring to FIG. 9, the MSE performance graph 900 of beam tracking shows MSE values according to KF beam tracking (proposed) and MSE values according to ABP beam tracking (ABP tracking).

According to an embodiment of the present invention, the BS 100 may exhibit high MSE performance in the conventional ABP beam tracking by performing KF beam tracking to which a monopulse signal is applied.

Figure 10:
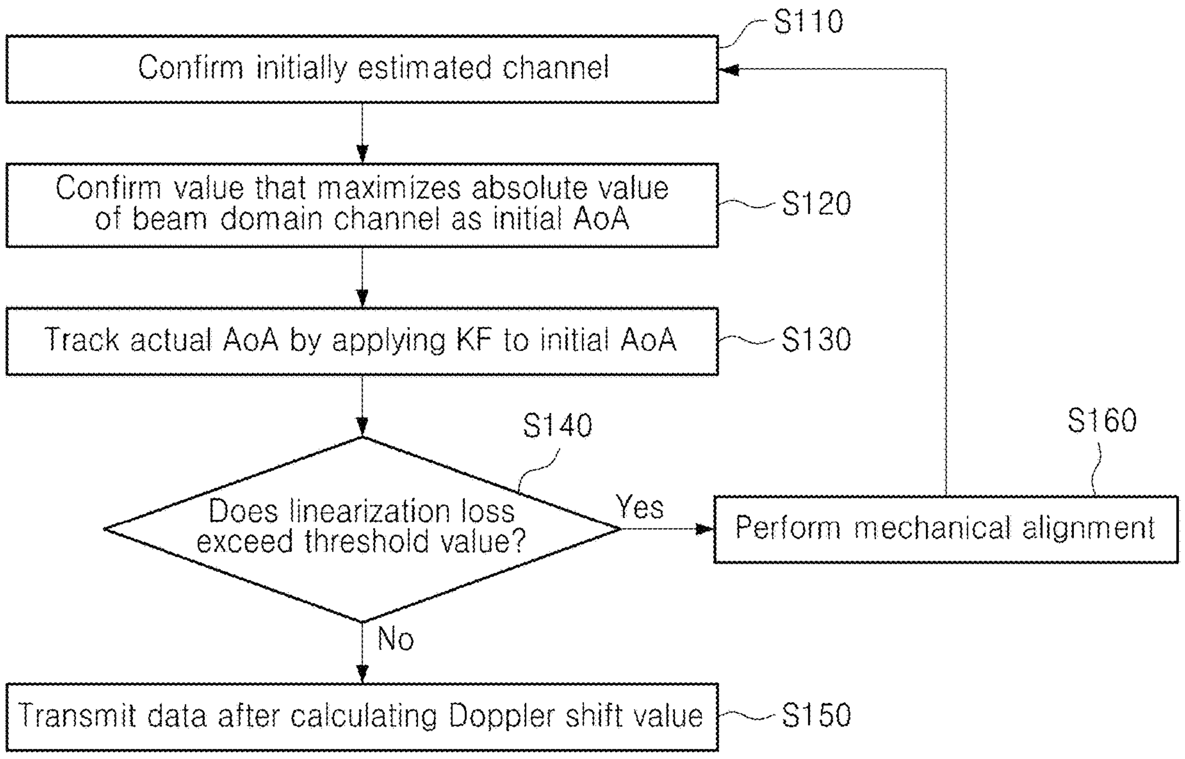
FIG. 10 is a flowchart illustrating the operation of performing beam tracking by a BS according to an embodiment of the present invention.

FIG. 10 is a flowchart illustrating the operation of performing beam tracking by a BS according to an embodiment of the present invention.

Referring to FIG. 10, in operation S110, the BS 100 may confirm the initially estimated channel.

In operation S120, the BS 100 may confirm the mk-th column index, which maximizes the absolute value of the beam domain channel, as the initial AoA. For example, the BS 100 may calculate the beam domain channel based on the initially estimated channel.

In operation S130, the BS 100 may track the actual AoA by applying a KF to the initial AoA. For example, the BS 100 may calculate the actual AoA by removing the relative DFO included in the initial AoA using a phase rotation matrix. The BS 100 may calculate the phase rotation matrix using a phase rotation vector and a rotation angle with respect to the x axis and y axis of the k-th UAV.

According to an embodiment of the present invention, the BS 100 may orthogonally project the position of the k-th UAV onto the xz plane and the yz plane, confirm the distance to the k-th UAV, the speed, and the distance estimation value when movement of the k-th UAV is orthogonally projected onto the xy plane, and generate a state model in the n-th frame using the confirmed distance, speed, and distance estimation value. Thereafter, the BS 100 may generate a measurement model by applying measurement noise of the monopulse signal to the measurement model.

According to an embodiment of the present invention, the BS 100 may track the actual AoA by applying a KF to the state model and the measurement model.

In operation S140, the BS 100 may determine whether the linearization loss for the tracked actual AoA exceeds a threshold value.

When the calculated linearization loss exceeds a preset threshold value as a result of performing operation S140 described above, the BS 100 may transmit data after calculating a Doppler shift value in operation S150.

According to an embodiment of the present invention, the BS 100 may estimate a position vector for the k-th UAV, and calculate a Doppler shift value for each frame using the estimated position vector. Thereafter, the BS 100 may compensate for the DFO of the antenna 120 using the calculated Doppler shift value, and control data to be transmitted through the antenna 120 for which the DFO has been compensated.

When the calculated linearization loss is smaller than or equal to a preset threshold value as a result of performing operation S140 described above, the BS 100 may perform mechanical alignment in operation S160. For example, the BS 100 may perform mechanical alignment on the array response vector of the BS 100 so that the value of the actual AoA is a value within a specific range. Thereafter, after the mechanical alignment is performed, the BS 100 may reconfirm the initially estimated channel by performing again operation S110 described above.

According to the present invention as described above, as a Doppler shift value is calculated and beam tracking is performed considering geometric relations and angle changes, a high-speed mobile UAV communication system has an effect of performing beam tracking in real-time for a UAV moving at a high speed.

In addition, as beam tracking is performed using an initial AoA, the present invention has an effect of reducing overheads of beam training according to high-speed movement of a UAV.

The effects of the present invention are not limited to the effects mentioned above, and unmentioned other effects will be clearly understood by those skilled in the art from the description of the claims.

However, this is only a preferred embodiment in accomplishing the objects of the present invention, and it goes without saying that some steps may be added or deleted as needed, and any one step may be performed to be included in another step.

Although the embodiments of the present invention have been described above with reference to the accompanying drawings, those skilled in the art may understand that the present invention can be implemented in other specific forms without changing the technical spirit or essential features. Therefore, the embodiments described above should be understood as illustrative and not restrictive in all respects.

DESCRIPTION OF SYMBOLS

10: Communication system
100: BS
**200-*k***: UAV

What is claimed is:

1. A method of performing beam tracking in high-speed mobile unmanned aerial vehicle communications, which is high-speed mobile UAV communications, by a base station (BS), the method comprising:

an initial beam training step including an operation of confirming an initially estimated channel for a k-th UAV among a plurality of UAVs connected through an antenna, and an operation of confirming an mk-th column index that maximizes an absolute value of a beam domain channel as an initial angle of arrival, which is an initial AoA; and a beam tracking step including an operation of tracking an actual AoA by applying a Kalman filter, which is a KF, to the initial AoA, wherein the beam tracking includes an operation of orthogonally projecting a position of the k-th UAV onto an xz plane and an yz plane, and confirming a distance to the k-th UAV, a speed, and a distance estimation value when movement of the k-th UAV is orthogonally projected onto the xy plane, and an operation of generating a state model in an n-th frame using the confirmed distance, speed, and distance estimation value.

2. The method according to claim 1, wherein the initial beam training step includes an operation of calculating the beam domain channel on the basis of the initially estimated channel.

3. The method according to claim 1, wherein the beam tracking step includes an operation of calculating the actual AoA by removing a relative Doppler frequency offset, which is a relative DFO, included in the initial AoA using a phase rotation matrix.

4. The method according to claim 3, wherein the beam tracking step includes an operation of calculating the phase rotation matrix using a phase rotation vector and a rotation angle with respect to an x axis and a y axis for the k-th UAV.

5. The method according to claim 1, wherein the initial beam training step further includes an operation of calculating the initial AoA using Equation 4 when the antenna is a uniform planar array, which is a UPA, wherein Equation 4 is $$F_{BS} = \frac{1}{\sqrt{N_x N_y}}(F_x \otimes F_y),\ [F_x]_{p,q} = e^{-j2\pi\frac{pq}{N_x}},\ [F_y]_{p,q} = e^{-j2\pi\frac{pq}{N_y}},$$

where $N_x$ is the number of antennas on the x axis and $N_y$ is the number of antennas on the y axis.

6. The method according to claim 1, wherein the beam tracking step further includes an operation of generating a measurement model by applying measurement noise of a monopulse signal to the state model.

7. The method according to claim 6, wherein the beam tracking step further includes an operation of tracking the actual AoA by applying the KF to the state model and the measurement model.

8. The method according to claim 7, wherein the beam tracking step further includes an operation of calculating a linearization loss for the tracked actual AoA.

9. The method according to claim 8, wherein the beam tracking step further includes an operation of performing mechanical alignment on the array response vector of the BS so that a value of the actual AoA becomes a value within a specific range when the calculated linearization loss is lower than a preset threshold.

10. The method according to claim 9, wherein the beam tracking step further includes an operation of reconfirming the initially estimated channel at the initial beam training step when the mechanical alignment is performed.

11. The method according to claim 8, wherein the beam tracking step further includes an operation of estimating a position vector for the k-th UAV when the calculated linearization loss exceeds a preset threshold, and an operation of calculating a Doppler shift value for each frame using the estimated position vector.

12. The method according to claim 11, further comprising a data transmission step including an operation of compensating a DFO of the antenna using the calculated Doppler shift value, and an operation of performing data transmission through the antenna with compensated DFO.

13. A base station (BS) performing beam tracking in high-speed mobile unmanned aerial vehicle communications, which is high-speed mobile UAV communications, the BS comprising:

an antenna configured to communicate with a plurality of UAVs; and a processor configured to confirm an initially estimated channel for a k-th UAV among the plurality of UAVs, to confirm an mk-th column index that maximizes an absolute value of a beam domain channel as an initial angle of arrival, which is an initial AoA, and to track an actual AoA by applying a Kalman filter, which is a KF, to the initial AoA, wherein the beam tracking includes an operation of orthogonally projecting a position of the k-th UAV onto an xz plane and an yz plane, and confirming a distance to the k-th UAV, a speed, and a distance estimation value when movement of the k-th UAV is orthogonally projected onto the xy plane, and an operation of generating a state model in an n-th frame using the confirmed distance, speed, and distance estimation value.

* * * * *